United States Patent Office 3,373,027
Patented Mar. 12, 1968

3,373,027
ESTROGENIC COMPOUNDS AND ANIMAL GROWTH PROMOTERS
Edward B. Hodge, Phil H. Hidy, and Herbert L. Wehrmeister, Terre Haute, Ind., assignors to Commercial Solvents Corporation, a corporation of Maryland
No Drawing. Continuation-in-part of application Ser. No. 561,371, June 29, 1966. This application Mar. 3, 1967, Ser. No. 620,261
10 Claims. (Cl. 99—2)

ABSTRACT OF THE DISCLOSURE

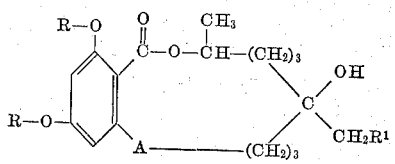

where R is selected from the group consisting of hydrogen, benzyl and lower alkyl, $R^1$ is selected from the group consisting of nitro- and amino-radicals and A is a radical selected from the group consisting of —CH=CH— and —$CH_2$—$CH_2$—, and animal feeds containing growth promoting amounts thereof.

---

This application is a continuation-in-part of application Serial No. 561,371, filed June 29, 1966, now abandoned.

The present invention relates to new compounds and an object of the present invention is to provide compounds which exhibit estrogenic activity or aid in increasing the rate of growth in meat-producing animals, e.g., cattle, lamb and swine.

The compounds of this invention are illustrated by the formula:

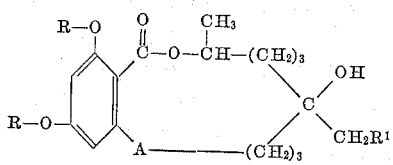

where A is —$CH_2$—$CH_2$— or —CH=CH; R is hydrogen, substituted or unsubstituted alkyl, e.g., lower alkyl such as methyl, ethyl, hexyl, etc., or aralkyl, e.g., benzyl; and $R^1$ is an amino-or nitro-radical.

The compounds of the present invention can be produced from the compound:

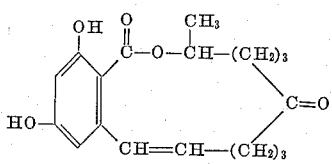

hereinafter referred to as the fermentation estrogenic substance (F.E.S.) by condensation of nitromethane and F.E.S. with one equivalent of sodium ethoxide in alcoholic solution and conversion of the resulting sodio derivative to the desired compound.

It is desirable to protect the hydroxyl groups against undesirable side reactions before reaction which can be accomplished by converting the hydroxyl groups on the benzene ring of F.E.S. to ethers, e.g., methyl ethers, as taught in U.S. Patent 3,239,342 and subsequently removing the masking group to regenerate the hydroxyl group. The hydroxyl group can be regenerated from, for example, a methyl ether by hydrolysis or by refluxing in acetic acid solution with hydrobromic acid. Aluminum chloride is another effective dealkylating agent. Benzyl groups are also suitable masking groups and can be removed by catalytic reduction. Benzyl ethers of F.E.S. are described in copending application Serial No. 532,113, filed Mar. 7, 1966, now abandoned and application Ser. No. 620,259, filed Mar. 3, 1967.

The compounds can be administered to animals by any suitable method including oral and parenteral administrations. For example, the compound can be blended with ordinary feed containing nutritional values in an amount sufficient to produce the desired rate of growth and can thus be fed directly to the animals, or the compound can be suspended in a suitable injection suspension medium such as peanut oil and injected parenterally. The amount of compound fed to an animal, of course, varies depending upon the animal, desired rate of growth and the like.

When the new compounds are to be administered in feeds, an animal feed composition may be prepared containing the usual nutritionally-balanced quantities of carbohydrates, proteins, vitamins and minerals, together with the compound of the present invention. Some of these usual dietary elements are grains, such as ground grain and grain by-products; animal protein substances, such as those found in fish meal and meat scraps, vegetable proteins like soybean oil meal or peanut oil meal; vitaminaceous materials, e.g., vitamin A and D mixtures; riboflavin supplements and other vitamin B complex members; and bone meal and limestone to provide minerals. A type of conventional feed material for use with cattle includes alfalfa hay and ground corn cobs together with supplementary vitaminaceous substances if desired.

The following examples serve to illustrate the invention.

Example I

Condensation of nitromethane with F.E.S. 2,4-dimethylether is conducted with one equivalent of sodium ethoxide in absolute ethanol to produces a sodio derivative which is collected and stirred with dilute acetic acid to produce:

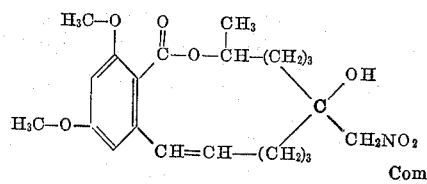
Compound 1

Example II

The nitro group of Compound 1 is reduced by shaking an acetic acid solution of the compound with a catalytic amount of Raney nickel at 100 p.s.i. hydrogen and about 35° C. to produce.

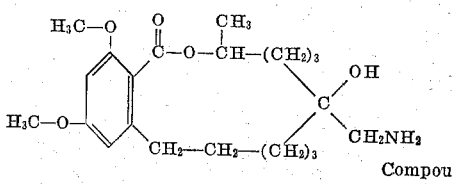
Compound 2

Example III

The nitro group of Compound 1 is also reduced by slowly adding 1 gram sodium borohydride to 50 ml. methanol containing 0.3 gram of Compound 1 while cooling the mixture. After heating for two hours on a steam bath to evaporate methanol, the residue is neutralized with HCl and extracted with ether to obtain:

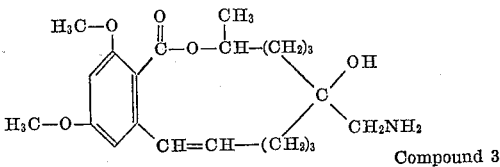
Compound 3

Example IV

Compound 1 is demethylated by heating at 120° C. in benzene solution with two equivalents of aluminum chloride to produce:

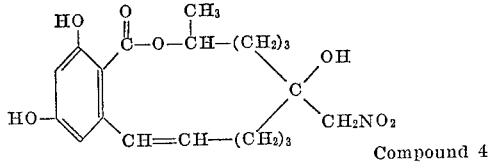
Compound 4

Example V

Dihydro F.E.S. 2,4-diethylether and F.E.S. 2,4-dibenzylether are condensed according to the procedure of Example I to produce the corresponding nitro derivatives.

Example VI

Condensation of nitromethane with F.E.S. 2,4-dibenzylether is conducted with one equivalent of sodium ethoxide in absolute ethanol to produce a sodio derivative which is collected and stirred with dilute acetic acid to produce:

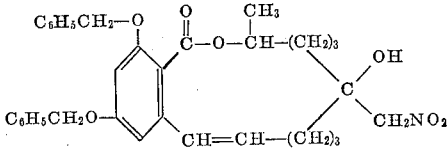

Example VII

The nitro group of the compound produced in Example VI is reduced by shaking an acetic acid solution of the compound with a catalytic amount of Raney nickel at 100 p.s.i. hydrogen and about 35° C. to produce:

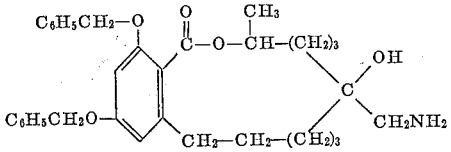

Example VIII

The nitro group of the compound produced in Example VI is also reduced by slowly adding 1 gram sodium borohydride to 50 ml. methanol containing 0.3 gram of Compound 1 while cooling the mixture. After heating for two hours on a steam bath to evaporate methanol, the residue is neutralized with HCl and extracted with ether to obtain:

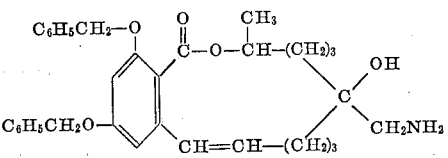

Example IX

The compound produced in Example VI is debenzylated by catalytic reduction using Raney nickel catalyst and hydrogen at 100 p.s.i.g. and 35° C. to produce:

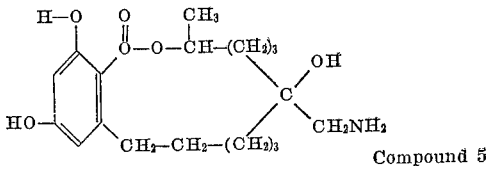
Compound 5

Example X

Dihydro F.E.S. 2,4-diethylether and F.E.S. 2,4-dimethylether are condensed according to the procedure of Example I to produce the corresponding nitro derivatives.

Example XI

Six head of cattle are fed a daily ration including a mixture of alfalfa hay and ground corn cobs containing from 5 to 20 ounces per 100 pounds feed of Compound 1 and their rate of growth is improved.

Example XII

Six head of cattle are fed a daily ration including a mixture of alfalfa hay and ground corn cobs containing from 5 to 20 ounces per 100 pounds feed of Compound 5 and their rate of growth is improved.

The following are specific examples of animal feed compositions of this invention useful for increasing the rate of growth and feed efficiency of young animals to market weight.

Example XIII

For young beef cattle, i.e., calves to yearlings running to two-year olds, each animal is given 5 to 20 milligrams per day of the compound produced in Example I intimately admixed in about 18 to 22 pounds per head per day of a complete pelleted ration for about 180 days. The complete pelleted ration includes in addition to the compound of Example I the following:

| | | |
|---|---|---|
| Barley | percent | 40–43 |
| Molasses dried beet pulp | do | 34.5–37.5 |
| Alfalfa pellets | do | 8.0 |
| Tallow | do | 2.5 |
| Calcium carbonate | do | .30 |
| Urea | do | .30 |
| Phosphorus source | do | .40 |
| Salt | do | .50 |
| Molasses | do | 10.00 |
| Trace mineral | do | 0.5 |
| Vitamin A | MMI.U./ton | 2–4 |

*Note.*—Milo or corn, for example, can be substitute for the barley.

The compound of Example I is admixed with the above ingredients in a stationary blender or a feed mix truck in the following amounts in grams per ton to provide an appropriate complete pelleted feed with dosage levels ranging from 5 to 90 milligrams per head per day.

| Grams/ton: | Mg./head/day |
|---|---|
| .5 | 5 |
| 1.0 | 10 |
| 2.0 | 20 |
| 4.0 | 40 |
| 8.0 | 80 |

These gram amounts are premixed with, for example, 10 pounds of soybean hulls prior to admixture with the other ingredients.

Example XIV

For young swine, i.e., six week old pigs to about 100 pound pigs, each animal is given 5 to 20 milligrams per day of the compound of Example II intimately admixed in about 1½ to 5½ pounds per head per day of a grower ration until it reaches a weight of about 100 pounds. When the swine weigh between 90 and 125 pounds the feed is changed to one whereby each animal is given 20 to 50 milligrams per day of the compound of Example II intimately admixed in about 5½ to 10 pounds per head per day of a finisher ration until it reaches market weight of about 220 pounds. The grower and finisher ration include in addition to the compound of Example II the following:

|  | Grower, percent | Finisher, percent |
|---|---|---|
| Ground Yellow Corn | 77 | 86.7 |
| Soybean Meal (44% protein) | 16 | 6.5 |
| Meat and Bone Scraps (50% protein) | 2.5 | 2.5 |
| Dehydrate Alfalfa Meal (17%) | 2.5 | 2.5 |
| Steamed Bone Meal | 0.5 | 0.5 |
| Ground Limestone | 0.5 | 0.3 |
| Iodized Salt | 0.5 | 0.5 |
| Vitamin, Antibiotic and Trace Mineral Premix | 0.5 | 0.5 |

The compound of Example II is admixed with the above ingredients in a blender in the following amounts in milligrams per pound to provide an appropriate feed with dosage levels ranging from 6 to 96 milligrams per head per day.

| Mg./pound: | Mg./head/day |
|---|---|
| 2 | 6 |
| 4 | 12 |
| 8 | 24 |
| 16 | 48 |
| 32 | 96 |

Example XV

For 4- to 10-month old lambs weighing 50 to 70 pounds, each animal is given 1 to 15 milligrams per day of one compound of Example IV, intimately admixed in about 3 to 6 pounds per head per day of a complete ration for 30 to 90 days. The complete ration includes in addition to the compound of Example IV the following:

| | Pounds |
|---|---|
| Finely ground corn cobs | 630 |
| Ground corn | 600 |
| Dehydrated alfalfa meal | 300 |
| Dried molasses | 120 |
| Soybean meal (44% protein) | 300 |
| Dicalcium phosphate | 14 |
| Trace mineral salt | 17 |
| Premix vitamin, mineral and antibiotic | 19 |

The compound of Example IV is admixed with the above ingredients in a blender in the following amounts in milligrams per pound to provide an appropriate complete feed with dosage levels ranging from 1 to 15 milligrams per head per day.

| Mg./pound: | Mg./head/day |
|---|---|
| .5 | 2 |
| 1.0 | 4 |
| 1.5 | 6 |
| 2.0 | 8 |
| 2.5 | 10 |
| 3.75 | 15 |

Example XVI

For broilers, i.e., day old to four-week-old chicks, a grower feed is prepared for feeding to the chicks for the first four weeks and a finisher feed is prepared for feeding the four week old chicks for the last five weeks until they reach market weight of two and a half to three pounds dressed. For each pound of weight gain, the chicks eat about 1.5 to 2 pounds of feed. Thus they eat about 1.5 pounds of feed during the first four weeks and about five pounds of feed during the next five weeks. During the course of this feeding schedule, each bird should receive a total of about 12 to 36 milligrams of the compound of Example IX in the grower and finisher feed each of which includes in addition to the compound of Example IX the following:

|  | Grower (lbs.) | Finisher (lbs.) |
|---|---|---|
| Ground Yellow Corn | 1,000 | 1,200 |
| Soybean Meal (44% Protein) | 700 | 500 |
| Fish Meal (60% Protein) | 100 | 80 |
| Alfalfa Meal | 50 | 50 |
| Meat and Bone Scraps | 0 | 30 |
| Animal Fat | 0 | 30 |
| Dicalcium Phosphate | 80 | 80 |
| Iodized Salt | 35 | 40 |
| Limestone | 10 | 10 |
| Premix Vitamins Trace Minerals and Antibiotics | 15 | |
|  | 10 | 10 |

It is claimed:

1.

$$\begin{array}{c} R-O \\ \\ R-O \end{array} \begin{array}{c} O \quad CH_3 \\ \| \quad | \\ C-O-CH-(CH_2)_3 \\ \\ A-(CH_2)_3 \end{array} \begin{array}{c} \\ \\ C \end{array} \begin{array}{c} OH \\ \\ CH_2R^1 \end{array}$$

where R is selected from the group consisting of hydrogen, benzyl and lower alkyl, $R^1$ is selected from the group consisting of nitro- and amino-radicals and A is a radical selected from the group consisting of —CH=CH— and —CH$_2$—CH$_2$—

2. The compound of claim 1 wherein R is hydrogen, $R^1$ is nitro and A is —CH=CH—.
3. The compound of claim 1 wherein R is hydrogen, $R^1$ is nitro and A is —CH$_2$—CH$_2$—.
4. The compound of claim 1 wherein R is hydrogen, $R^1$ is amino and A is —CH=CH—.
5. The compound of claim 1 wherein R is hydrogen, $R^1$ is amino and A is —CH$_2$—CH$_2$—.
6. The compound of claim 1 wherein R is lower alkyl, $R^1$ is nitro and A is —CH=CH—.
7. The compound of claim 1 wherein R is lower alkyl, $R^1$ is amino and A is —CH$_2$—CH$_2$—.
8. The compound of claim 1 wherein R is lower alkyl, $R^1$ is amino and A is —CH=CH—.
9. The compound of claim 1 wherein R is lower alkyl, $R^1$ is amino and A is —CH$_2$—CH$_2$—.
10. An animal feed composition comprising a nutrient ration and a growth promoting amount of the compound of claim 1.

No references cited.

A. LOUIS MONACELL, *Primary Examiner.*

H. H. KLARE III, *Assistant Examiner.*